United States Patent Office 3,199,625
           Patented Aug. 10, 1965

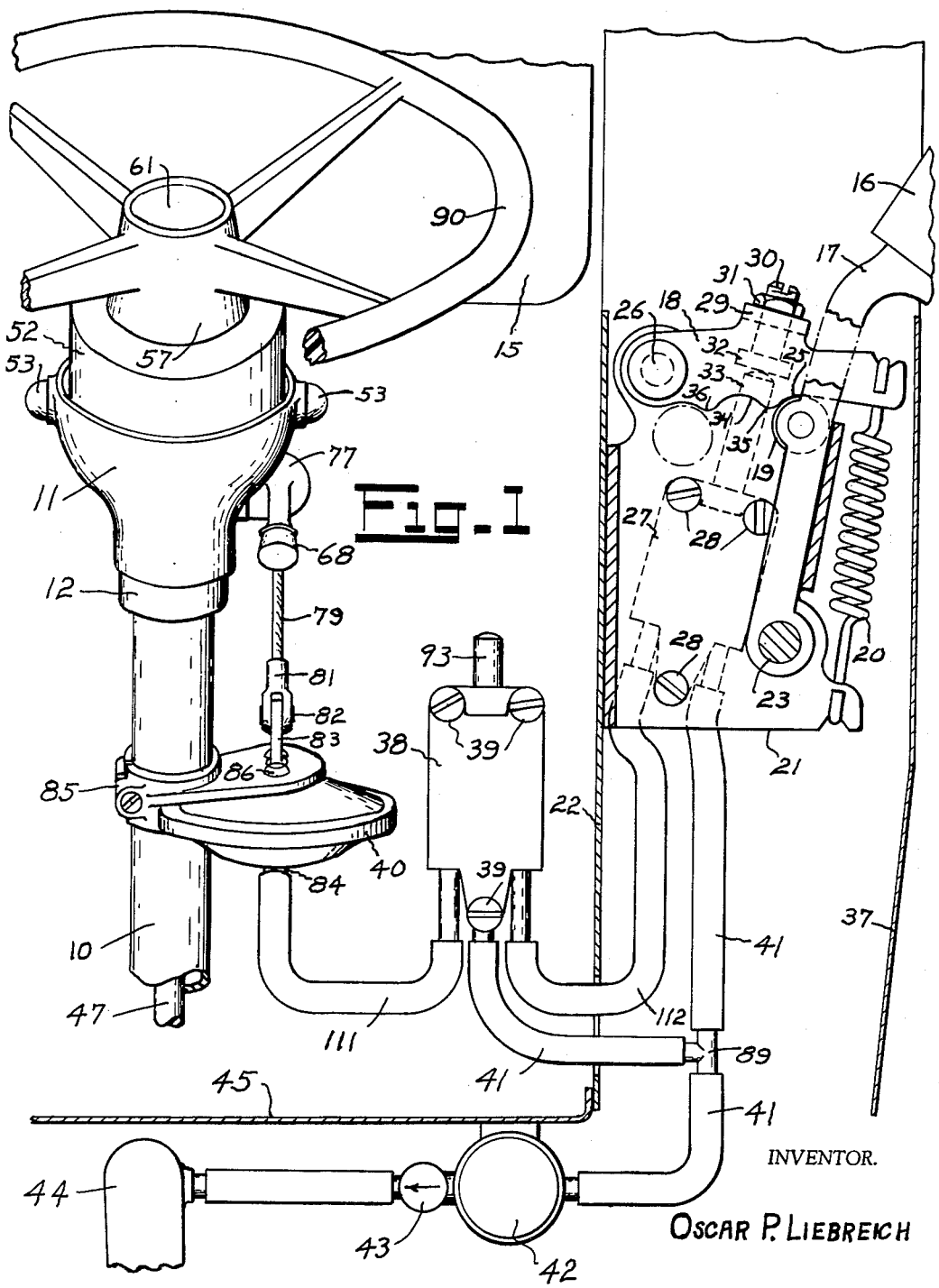

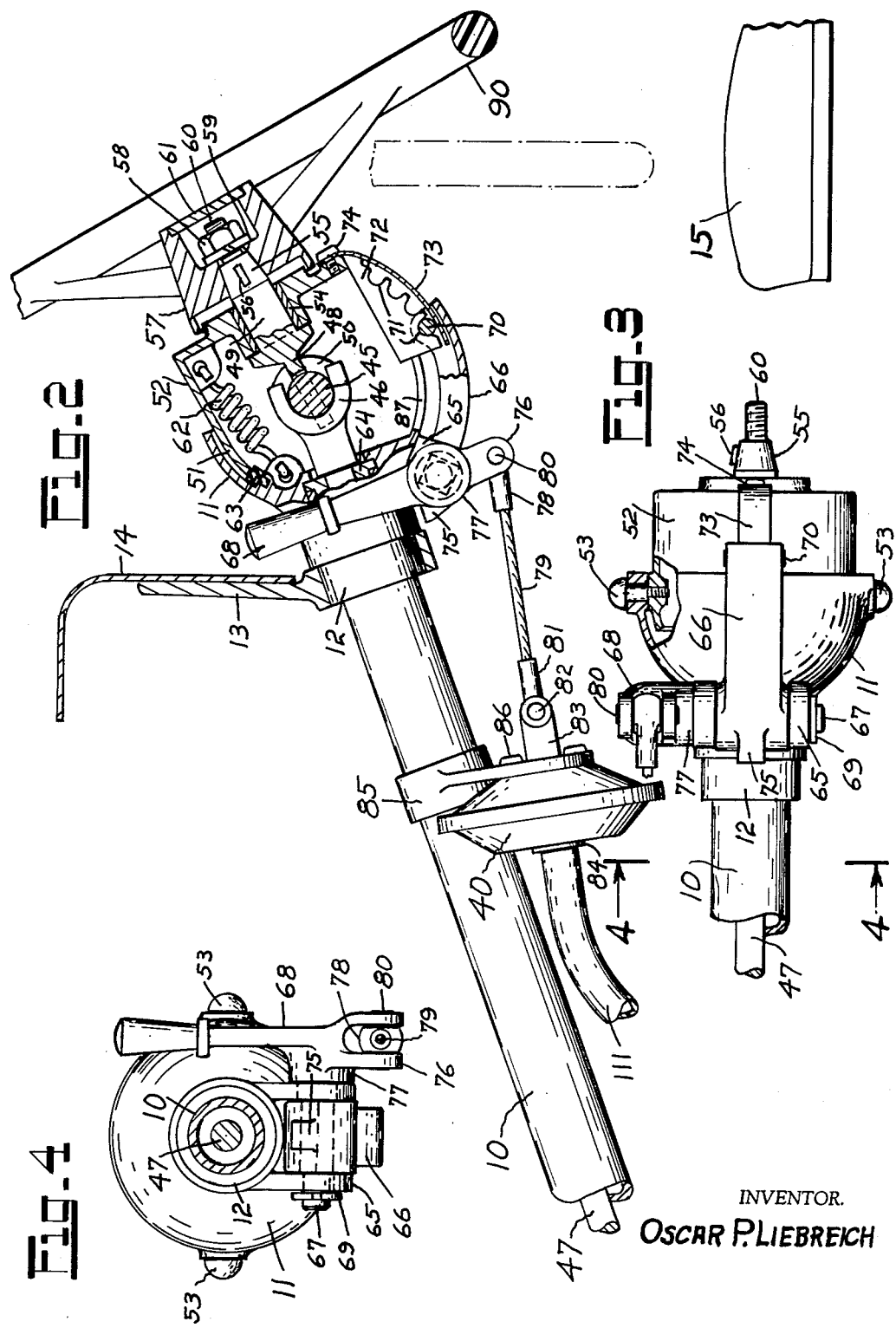

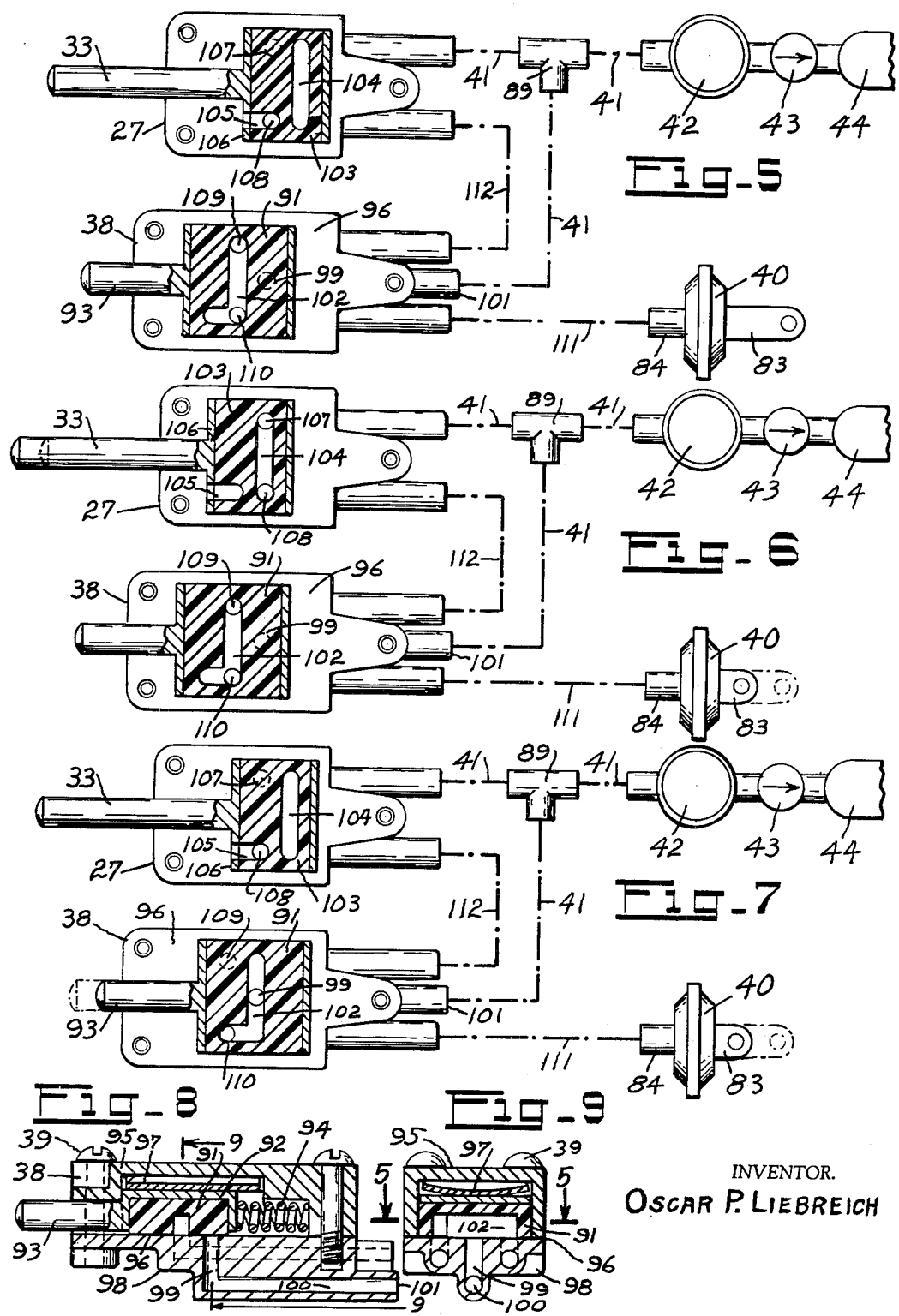

3,199,625
AUTOMATIC CONTROL FOR ADJUSTABLE
STEERING WHEELS
Oscar P. Liebreich, 2658 N. Main St., Waterbury, Conn.
Filed Jan. 30, 1964, Ser. No. 341,351
8 Claims. (Cl. 180—77)

This invention relates to automotive steering systems such as wheels, tillers, consoles, and the like but more specifically to adjustable types which can be selectively moved and positioned at will relative to the operator's seat and which will be automatically released from a preselected position when an adjacent exit door is opened.

One object of the invention is to provide an improvement in automobiles which embodies a latched adjustable steering wheel, or other guidance control, whereby the adjustable steering device will be automatically unlatched when the door to the operator's position is opened.

Another object is to provide an improvement of the above nature in which a manually operated latch is provided to preset the steering device and power means is provided to release same.

A further object is to provide an improvement, of the above nature, in which the steering device is provided with means to retract the steering wheel away from the driver's seat and thus provide easy entrance and exit.

A still further object is to provide an improvement of the above nature whereby vacuum power, controlled by a door operated switch, is utilized to release the steering wheel.

A still further object is to provide an improvement of the above nature with a supplementary manually operated means whereby the wheel may be released using the operator's foot independent of the door and the hand control, whereby the operator may employ both hands to move the steering wheel.

A still further object is to provide an improvement of the above nature whereby a control cam is associated with the door hinge to first cause the release of the steering wheel when the door is opening and then cause the wheel to be secured or latched in a new position while the door is being held open by said cam.

Still other objects of the invention are to provide improvements bearing the above objects which will enhance the comfort and safety of automobile operation whereby the position of the steering wheel or other adjustable device may be changed at will, or automatically, to vary the stance of the operator's arms and body for added comfort while driving and while entering or leaving the vehicle, which is of simple construction, has a minimum number of parts, is inexpensive of manufacture, and which is effective and efficient in operation.

Other objects and advantages will become apparent and a better understanding of the invention will be had from a consideration of the following description, forming the specification, in which there has been illustrated on the accompanying drawings one form of the invention as applied to an automobile, in which unrelated parts have been eliminated for simplicity and clarity.

In the drawings:

FIG. 1 represents a fragmentary top plan view of the invention applied to an automobile, partially in section, and indicates a steering column with an adjustable steering wheel provided with power release, exit door, valve operating cam, door valve, foot valve, vacuum source and connections.

FIG. 2 is a fragmentary elevation of the steering column showing in solid lines the hand and power release with the hub of the adjustable steering wheel tilted in its top, its uppermost position, partially in section and indicating in dotted lines the bottom, or lowermost, position of the steering wheel rim relative to the operator's seat, and also in dotted lines the squared stepped diameter shaft of the manual operating lever.

FIG. 3 is partially in section and represents an underside view of the adjustable steering hub in its normal in-line position with steering column bracket and steering wheel removed, and illustrates the spring pressed locking latch.

FIG. 4 is a sectional view taken on line 4—4 of FIG. 3, showing in dotted lines the squared stepped diameter shaft of the release lever engaging the hub latch as it engages the hub of the latch lever.

FIG. 5 represents a connection diagram comprising vacuum door and foot operated valves, vacuum source, check valve and vacuum power unit with wheel locked, all in the position shown in FIG. 1, both valves shown in "Off" position with only stem and valve cores in section as on line 5—5 in FIG. 9, but with valve cover and return spring removed for clarity.

FIG. 6 is a diagram similar to FIG. 5 but with the door valve in the "On" position, foot valve in the "Off" position, and wheel unlocked, the normal position of the vacuum power unit being shown in dotted lines.

FIG. 7 is a diagram similar to FIG. 5 but with foot valve "On", door valve "Off", and wheel unlocked, the normal position of the power unit being shown in dotted lines.

FIG. 8 is an enlarged vertical section of the foot valve taken along the centerline of the valve stem and showing how the valve core seals off the middle vacuum port as in FIGS. 5 and 6.

FIG. 9 is a cross sectional view along the flat valve surface at line 9—9 of FIG. 8, showing the sliding valve core and the flat spring urging the core against the flat valve surface to effect an air-tight seal.

With continued reference to the drawings, there is shown in FIG. 1 a portion of the steering compartment of an automobile with steering column 10 provided with lower steering hub 11 having extension 12 adapted to be secured by bracket 13 attached to instrument panel 14, as shown in FIG. 2. Also shown in FIG. 1 is steering wheel 90 and conveniently placed operator's seat 15 contiguous to exit door 16 shown in part and open. Door 16 is provided with lower hinge 17, shown partly interrupted and indicated by the dotted lines, to more clearly show door-holding cam plate 18 held against hinge roller 19 by spring 20 secured at one end to the floor of hinge frame 21. Hinge frame 21 is secured to inner body shell 22 and supports hinge pin 23 upon which the door hinge swings from a closed-door position to the fully open position as shown with the side of the hinge stopped against a vertical section where it is held by cam pocket 25 forced against hinge roller 19 by tension spring 20. Hinge frame 21 supports door can 18 on cam pin 26 and vacuum door valve 27 secured under the hinge floor by flat head screws 28.

Cam plate 18 is provided with a flat depending L-shaped projection 29 provided with a threaded hole to receive threaded adjusting screw 30 with locknut 31 and flat head 32 adapted to press stem 33 of door-valve 27 and hold same "closed" or "Off." when roller 19 is confined in pocket 34 or 25 when the door is fully open as valve 27 is shown in FIGS. 5 and 7. Cam plate 18 also embodies cam pocket 34 to hold the door partially open as well as cam lobes 35 and 36 adjacent their respective cam pockets. When the exit door 16 is closed roller 19 is positioned substantially as shown by the dotted circle. The outer shell of the car body is shown at 37.

Foot-operated valve 38 is shown in FIG. 1 secured to the floor of the driver's compartment by screws 39 and is provided with three connection terminals for connections to the two terminals of valve 27, to vacuum power unit 40, to vacuum line 41 having T connector 89 which connects to vacuum accumulator 42 secured to body bulkhead 45, check valve 43, and engine manifold 44 from which vacuum power is derived, while the engine is in operation, to charge reserve tank 42.

Lower steering hub 11 secured to the upper end of steering column 10, FIG. 2, permits steering wheel 90 to swivel above and below the normal straight inline steering position by means of an internal ball type universal joint engaging forked end 46 of lower steering shaft 47 and forked end 48 of upper steering shaft 49, to form a flexible coupling and to permit rotation while the shafts are at an angle. Ball 45 is provided with transverse grooves 50 at right angles to each other which receive the steering shaft forks for angular drive. Lower steering shaft 47 rotates in bearing 64 pressed into the upper end of steering column 10.

Steering hub 11 represents the lower portion of a hollow hemisphere into which a mating spherical portion 51 of upper steering hub 52 is trunnioned by means of shouldered screws 53 on a horizontal axis to permit movement in a vertical plane, FIG. 3. Upper steering hub 52 is provided with bearing 54 which carries upper steering shaft 49 provided with tapered end 55 and key 56 to receive spoked steering wheel hub 57 of steering wheel 90 secured by means of threaded nut 58 and lock washer 59 on threaded end 60, and covered by plate 61. A pair of retraction springs 62 urge the steering wheel 90 to return to its upward, or top, position against cushion stop 63 set in stationary hub 11, when freely released from any one of its lowered positions.

Lower steering hub 11 is provided with a spaced pair of journal boxes 65 extending outward from the lower side and arranged to form a hinge for locking ratchet lever 66 by means of the squared and stepped diameter shaft 67 integral with the hub of hand operating lever 68 secured by retaining ring 69. Ratchet lever 66 is further provided with locking pin 70 arranged to seat in multiple notches 71 of lockplate 72 cast into the wall of upper steering hub 52. Flat spring 73 is secured to hub 52 by means of drive stud 74 and urges locking pin 70 to seat in notches 71. Ratchet lever 66 is further provided with stop lug 75 which engages with hub 52 to limit the movement of lever 68 and ratchet lever 66. It should be noted that slot 87 is provided to permit notched plate 72 to move downward when the steering wheel is pivoted to its lowest position. Slot 87 is covered by latch 66, and notches 71 by flat spring.

Hand operating lever 68 is further provided with spaced bosses 76 integral with and extending downwardly from its hub 77 to form a lever to which is attached terminal 78 at one end of flexible cable 79 and secured by pushpin 80. The other end of cable 79 is provided with a clevis-type terminal 81 and pin 82 attached to link 83 of vacuum operated power unit 40 which has the usual pliable inner diaphragm and return spring, not shown, and vacuum connection terminal 84. Power unit 40 is anchored to steering column 10 by clamp bracket 85 to which it is secured by rivets 86.

Door valve 27 and foot valve 38 are of the same general design, consisting of a channeled resilient core slideable on a flat valve base surface provided with valve ports to establish the desired fluid connections when the core is shifted to connect with the desired valve ports. Both are three-way valves in that they each control three different circuits in various combinations. Therefore, for simplicity, only foot valve 38 will be described in detail and, as shown in FIG. 8, valve core 91 is mounted in a partial frame 92 integral with valve stem 93 and is spring pressed by return spring 94 which urges the sliding core to move to the left against the front end of valve cover 95, the core being urged against the flat valve surface 96 by curved spring 97 in the top of cover 95. Valve base 98 is provided with drilled ports such as vacuum port 99, FIG. 9, connecting with horizontal drilled passages, such as 100, in the valve connection terminals, such as 101. Valve cover 95 is secured to base 98 by means of three screws 39, FIG. 1, which are also utilized as mounting screws. In the several figures, valve core 91 of foot valve 38 is provided with L-shaped channel 102. Valve core 103 of door valve 27 has straight channel 104 and side channel 105 with a suitable vent passage through frame portion 106 and the valve cover, not shown. Door valve 27 is provided with vacuum port 107 leading to vacuum line 41 and T connection 89, and with vent port 108 and channel 104. Foot valve 38 has vent port 109 connected to power port 110 leading to power unit 40 by line 111. Vent ports of both valves are connected by line 112.

*Operation*

In the use of the invention as illustrated and described, and with the adjustable steering wheel 90 in its uppermost top position shown in FIGS. 1 and 2, the operator assumes a driving position behind the wheel and on seat 15, and closes adjacent door 16. With the door closed, concealed-type door-hinge 17 is swung inward to a position substantially over cam plate pin 26 and the cam roller 19 is at the position shown by the dotted circle, FIG. 1. Flat head 32 of adjustment screw 30, seated in cam plate extension 29 and urged by tension spring 20, holds stem 33 of door valve 27 secured under the floor of hinge 21, in its "Off" position as in FIGS. 1, 5 and 7. At the same time, stem 93 of foot valve 38, urged by its internal spring 94, FIG. 8, is all the way out and valve 38 is likewise in its "Off" position, FIGS. 1, 5 and 6. Now, valve vacuum ports 107 and 99 in the two valves are closed by their respective valve cores, and atmospheric air exists in side channel 105 and vent port 108 of valve 27, in connecting line 112, in vent port 109, channel 102 and power port 110 of valve 38 and connected to line 111 and power unit 40, so that link 83, cable 79, and latch lever 66 are all released and lock pin 70 is seated in the lowest notch 71 of lockplate 72 to firmly lock the steering wheel.

In operation, while driving, the operator might wish to adjust the steering wheel to a more comfortable position to suit the stance of his arms and body, and he or she can do so by moving control lever 68 backward with one hand to release lock pin 70 and adjust the wheel with the other hand as desired, at which time flexible cable 79 yields without moving link 83 of power unit 40. Releasing lever 68 permits lock pin 70 to again lock the steering in the nearest position thereto. Although only four positions are shown, it should be obvious that any reasonable number can be provided.

The wheel may also be released for prepositioning by using foot-valve 38. The operator's foot pressure on valve stem 93 moves valve core 91 to the right, FIG. 7, connecting vacuum port 99 to power port 110 by means of channel 102, vent port 109 leading to valve 27 being closed, thereby connecting vacuum power unit 40 to vacuum accumulator 42 by means of lines 111, lines 41 and T 89. The flexible diaphragm inside power unit 40 is then drawn to the left, pulling cable 79 and releasing lockpin 70 from notch 71, FIG. 3. Ratchet lever 66 is lifted away from ratchet plate 72 through square shaft of lever 68, cable 79 and link 83. Thus the wheel is released by power means and both hands may be utilized to tilt it to a selectively predetermined set position as comfort requirements necessitate, even while driving, or the wheel may be permitted to freely respond to retraction springs 62 in the steering hub and move it to its top position against rubber bumper 63 for maximum space between seat 15 and the rim of the steering wheel 90 as shown in FIG. 2. The adjustable steering wheel is quickly locked as soon as valve 38 returns to its normally "off" position since the left side of vacuum power unit 40 is then quickly connected to atmosphere, FIG. 5, since all vacuum ports are sealed off and air is permitted to enter through side channel 105 and vent port 108 in valve 27, line 112, vent port 109 and power port 110 in valve 38, and line 111.

Where the driver of an automobile wishes to take a position behind the steering wheel, it is necessary to have ample room between the rim of the steering wheel and the operator's seat for safety and to prevent discomfort to stout and to large persons. Also, a rigidly positioned steering wheel might be most uncomfortable as well for short and for small persons, and might even provide a driving hazard. The adjustable steering wheel enables any driver to pre-select the angle of the wheel to best suit his body build and seat position, and with this invention a safe, comfortable lowered position of the steering wheel may be pre-selected either by hand or foot control. I have found that most people prefer to drive in the lower positions and also that they are seriously inconvenienced and delayed on leaving from the driving position when they forget to first raise the wheel. This invention, therefore, automatically unlatches the steering mechanism and quickly raises the steering wheel for maximum seat clearance, and it also locks it in the top position for assistance in entering or leaving when it is desired to grasp the wheel in so doing.

As soon as the egress closure, or door, to the operator's compartment is opened, as in FIG. 1, hinge roller 19 swings from the dotted position shown to a new position such as cam pocket 34, on the way riding over cam lobe 36 to move cam plate 18 outward against the tension of spring 20. Outward movement of cam plate 18 also moves the head 32 of adjusting screw 30 so that the stem of normally closed-door-valve 27 moves valve core 103 from the "off" position of FIG. 5 to the "on" position of FIG. 6, thereby motivating power unit 40 to release adjustable steering steering wheel 90, in the same manner as previously described when using foot-valve 38, so that retraction springs 62 quickly snap the wheel to its top position for maximum overseat clearance for the operator. When valve 27 is thus released, vacuum port 107, FIG. 6, is connected to vent port 108 by channel 104 connecting vacuum from reserve tank 42, through lines 41 and T connection 89 and line 112 to normally "off" foot valve 38 to vent port 109, channel 102, power port 110 and line 111 to vacuum power unit 40.

Cam plate 18 and hinge roller 19 also serve to hold the door partly open with the roller seated in pocket 34 as above described or the door may be fully opened as shown in FIG. 1 at which time the roller will have moved over lobe 35 for ain additional power impulse as above described; but, whenever the roller is seated in either of the cam pockets, spring 20 retracts the cam plate and returns valve 27 to its normally "off" position, FIG. 5, and the steering wheel is again locked in position. If for any reason the adjustable steering wheel is left in a lowered postion, with the operator not present and with the door closed, it will be automatically snapped to the top upward position when the door is opened and thus provide maximum ease and safety when getting into or out of the driver's seat. Reserve tank 42, with check valve 43, stores vacuum power for lengthy periods of time and, since all valves are "off" during normal driving, there is no added vacuum demand and no interference with normal engine operation and efficiency.

While there has been disclosed in this specification one form in which the invention may be embodied, it is to be understood that this form is shown for the purpose of illustration only, and that the invention is not limited to the specific disclosure, but may be modified and embodied in various other equivalent forms without departing from its spirit. For example, other power sources may be employed, such as electricity from storage batteries, air under positive pressure instead of vacuum, or electro-pneumatic combinations. Also, it use need not be confined to automobiles per se, but can readily be applied to boats, trucks, earth moving, farm and other equipment, or to any self propelled vehicles. Likewise, it can be applied to any type of steering system for self-propelled vehicles, such as steering wheels mounted on steering columns that swivel or slide horizontally, on columns that swivel in any direction, and with steering systems that employ an adjustable steering console instead of a steering wheel per se. In short, the invention includes all the modifications and embodiments coming with the scope of the following claims.

Having thus decribed my invention, what is claimed as new and useful, and for which it is desired to obtain Letters Patent, is:

1. In an automobile, a normally closed exit door, hinges for said door, an operator's seat, and adjustable steering wheel selectively positionable relative to said seat, retraction means associated with said adjustable steering wheel for normally retracting said wheel away from said seat, a latch for normally holding said wheel in a preselected position, vacuum powered means for releasing said latch, a vacuum control valve actuated by one of the hinges of said door and vacuum connections whereby said wheel is retracted when said door is opened.

2. The invention as defined in claim 1, and a manually operated supplementary vacuum valve for retraction of said wheel independent of said hinge operated vacuum valve.

3. In a steerable vehicle having a seat and defining an opening adjacent the seat through which a driver can gain entrance to the vehicle and a door for said opening which is movable between an open and a normally closed position, the combination comprising a manually adjustable steering device inside the vehicle which device can be selectively positioned and locked in a plurality of different positions while said door remains in its closed position, said different positions of said steering device including at least a normal driving position wherein it is closely spaced in relation to a portion of said seat on which the driver normally sits and a second position wherein it is more remotely spaced from said seat portion, a control device having a depressible member which member is located so as to be depressible by one foot of a driver sitting on said seat in a normal driving position, and means responsive to depression of said depressible member for moving said steering device to its second position.

4. In a steerable vehicle having a seat and a steering device adjacent the seat which can be selectively positioned in a plurality of different positions which include at least a normal driving position wherein said device is closely spaced in relation to a portion of said seat on which a driver normally sits and a second position wherein it is more remotely spaced from said seat portion, the combination comprising biasing means for urging said device toward said second position, releasable locking means for normally holding said steering device in any one of said different positions, said locking means having a normal locked condition at which it holds said steering device in a selected one of said different positions and an unlocked condition at which said steering device is freed for movement between said different positions, power actuated means for shifting said locking means between its locked and unlocked conditions, and a control means for said power actuated means positioned so as to be operable by one foot of a driver sitting on said seat portion to allow said driver to lock and unlock said steering device by means of his foot.

5. In a steerable vehicle having a seat and defining an opening adjacent the seat through which a driver can gain entrance to the vehicle and a door for said opening which is movable between an open and a normally closed position, the combination comprising a steering device adjacent the seat which can be selectively positioned in a plurality of different positions including at least a normal driving position wherein said device is closely spaced in relation to a portion of the seat on which a driver normally sits and a second position wherein it is more remotely spaced from said seat portion, biasing means for urging said device toward said second position, locking means for normally holding said steering device in any one of said different positions, said locking means having a normal locked condition at which it holds said steering device in a selected one of said different positions and an unlocked condition at which said steering device is freed for movement between said different positions, power actuated means for shifting said locking means between its locked and unlocked conditions, and control means for said power means which control means is responsive to opening movement of said door to cause said power actuated means to shift said locking means to its unlocked condition during an initial portion of the opening movement of said door and to cause said power actuated means to return said locking means to its locked condition during a final portion of its opening movement so that as said door is opened said steering device is unlocked, moved to said second position by said biasing means and then locked in said second position.

6. The combination as set forth in claim 5 further characterized by a foot operable control means for said power actuated means.

7. In a steerable vehicle having a forwardly facing driver's seat, a side opening through which the driver can gain access to a portion of said seat, a door movable between open and closed positions relative to said opening, and a fixed steering column, the combination comprising a steering wheel pivotally mounted on said steering column for movement about an axis transverse to said column into any one of a plurality of different positions relative to said seat, biasing means for urging said wheel toward its most remote position relative to said seat, a manually operable lever carried by said steering column, steering wheel locking means operatively connected to said lever for normally locking said steering wheel in any one of said positions, said locking means having a normal locked condition at which it holds said steering device in a selected one of said different positions and an unlocked condition at which said steering device is freed for movement between said different positions, a fluid motor having a stationary part attached to said vehicle and a reciprocable part connected to said locking means, a source of fluid at a pressure other than atmospheric pressure, and a motor control valve means for connecting and disconnecting said fluid motor to the atmosphere and to said source in response to opening movement of said door and in such a manner as to cause said fluid motor to move said reciprocable part in the direction to unlock said locking means during an initial portion of the opening movement of said door and to move said reciprocable part in the opposite direction to lock said locking means during a final portion of the opening movement of said door.

8. The combination as set forth in claim 7 further characterized by a foot operable control valve means for connecting and disconnecting said fluid motor to the atmosphere and to said source in response to operation thereof by the foot of a driver.

References Cited by the Examiner
UNITED STATES PATENTS

| | | | |
|---|---|---|---|
| 2,086,025 | 7/37 | Gano | 296—44.03 |
| 2,436,153 | 2/48 | Sanmori | 280—87 |
| 2,551,054 | 5/51 | Sanmori | 296—44 |
| 2,822,214 | 2/58 | Rivolta | 296—44 |
| 2,845,810 | 8/58 | Sampson | 74—556 X |
| 2,903,904 | 9/59 | Mackie | 74—493 |
| 3,078,945 | 2/63 | Frey | 180—82 |
| 3,144,785 | 8/64 | Steiner et al. | 74—493 |

FOREIGN PATENTS

| | | |
|---|---|---|
| 195,768 | 2/58 | Austria. |
| 1,143,724 | 2/63 | Germany. |

BENJAMIN HERSH, *Primary Examiner.*

A. HARRY LEVY, *Examiner.*